W. S. McCURDY.
GRAVITY CARRIER.
APPLICATION FILED JULY 29, 1912.
1,077,540.
Patented Nov. 4, 1913.
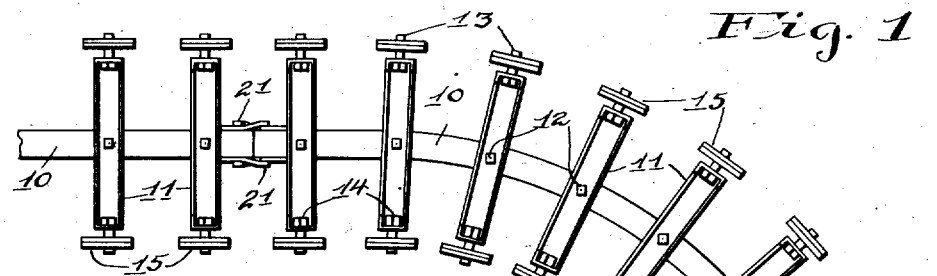
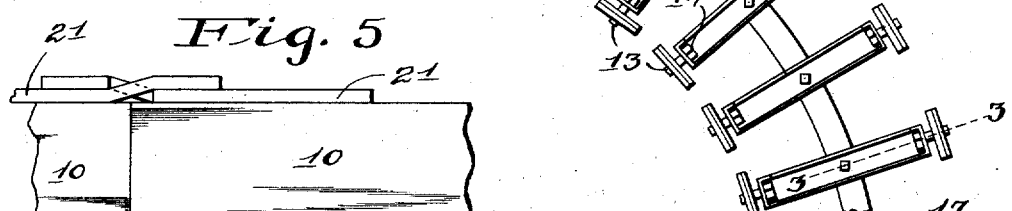
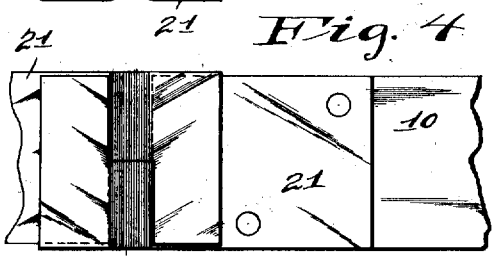
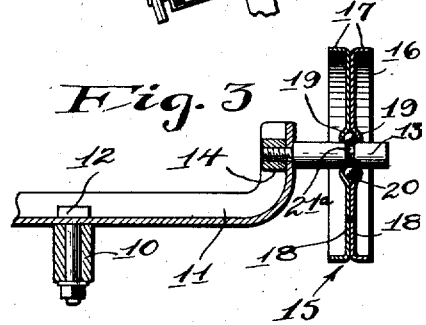
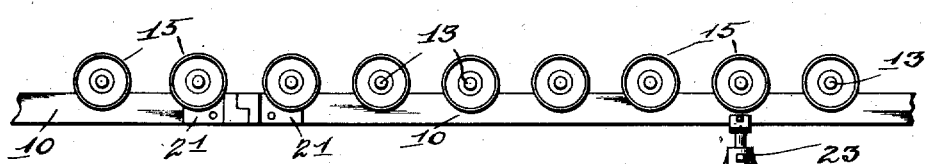
Witnesses
F. C. Caswell
T. M. Hardy
Inventor
William Stewart McCurdy
by John E. Styker atty.

UNITED STATES PATENT OFFICE.

WILLIAM STEWART McCURDY, OF ST. PAUL, MINNESOTA.

GRAVITY-CARRIER.

1,077,540.  Specification of Letters Patent.  Patented Nov. 4, 1913.

Application filed July 29, 1912. Serial No. 712,057.

*To all whom it may concern:*

Be it known that I, WILLIAM STEWART McCURDY, a citizen of the United States, residing at St. Paul, in the county of Ramsey and State of Minnesota, have invented new and useful Improvements in Gravity-Carriers, of which the following is a specification.

My invention relates to improvements in gravity carriers for transporting freight from one place to another. Its object is to provide a light, durable and inexpensive carrier formed in sections adapted to be quickly and easily assembled for use, or disassembled to be moved.

A further object is to provide a device of this kind wherein side friction is eliminated and the construction simplified by using a single rail support for a series of antifriction-wheels.

In the drawings, Figure 1 is a plan view of my improved gravity carrier; Fig. 2 is a side elevation of the same; Fig. 3 is a detail sectional view taken on the line 3—3 of Fig. 1; Fig. 4 is a detail side elevation showing the connection between two of the separable conveyer sections and Fig. 5 is a plan view of the same.

Referring to the accompanying drawings, I have designated the supporting rail by the numeral 10. Yokes 11, formed of elongated U shaped channel irons, are attached at intervals by bolts 12 to the rail 10. A stud 13 is secured by a nut 14 in each vertical end of said yokes 11 and antifriction-wheels 15 are mounted on said studs 13. The wheels 15 consist of two pressed metal sections 16, each comprising a rim 17, a web 18, and an annular curved flange 19. Said sections 16 are identical and when united as shown in Fig. 3, form with their rims 17 the bearing face of a wheel and with their flanges 19 a hub or ball-race adapted to retain a series of balls 20. A way 21ª is formed in each stud 13 to receive and provide a bearing for a series of balls 20. I prefer to construct the carrier in separate sections, which may be straight or curved as illustrated in Fig. 1. The rail 10 is provided on opposite sides of its ends with notched lugs 21 adapted to overlap and interlock with the lugs 21 of an abutting rail to join the carrier sections together. Adjustable standards 23 (one of which is shown in Fig. 2) support the rail 10 at any desired height.

Having described my invention, what I claim as new and desire to secure by Letters Patent is.

1. In a gravity-carrier, the combination of a rail, yokes mounted at intervals on said rail and extending beyond the sides thereof and antifriction-wheels on said yokes over which articles may be transported.

2. In a gravity-carrier, the combination of a rail, yokes mounted transversely on said rail and a wheel journaled at each extremity of said yokes.

3. A gravity-carrier formed of separable sections, each comprising a rail extending beyond the sides thereof, yokes on said rail, wheels journaled on said yokes and means for connecting the abutting sections.

4. In a gravity-carrier, the combination of a supporting rail, elongated U shaped yokes secured at their centers upon said rail, a pair of antifriction-wheels revoluble on each yoke, said wheels being mounted on the vertical ends of said yokes.

5. In a gravity-carrier, a rail, yokes secured at intervals on said rail, studs mounted on and extending beyond each yoke in horizontal alinement and antifriction-wheels revoluble on said studs.

6. In a gravity carrier, the combination of a supporting rail, a plurality of channel irons adapted to form wheel supports, said channel irons being secured at intervals on said rail and extending on either side thereof and wheels journaled at the ends of said channel irons.

7. In a gravity carrier, the combination of a supporting rail, a plurality of yokes attached at their centers to said rail and extending beyond the same, studs on the ends of said yokes, and wheels on said studs over which articles may be transported.

8. A gravity-carrier consisting of sections having coupling means at their ends, each section comprising a rail, a series of yokes arranged on said rail, studs on said yokes and antifriction wheels on said studs extending above said yokes.

In testimony whereof, I have signed my name to this specification in the presence of two subscribing witnesses.

WILLIAM STEWART McCURDY.

Witnesses:
DANIEL I. YORK,
F. C. CASWELL.

Copies of this patent may be obtained for five cents each, by addressing the "Commissioner of Patents, Washington, D. C."

---

It is hereby certified that in Letters Patent No. 1,077,540, granted November 4, 1913, upon the application of William Stewart McCurdy, of St. Paul, Minnesota, for an improvement in "Gravity-Carriers," errors appear in the printed specification requiring correction as follows: Page 1, lines 70-71, strike out the words "extending beyond the sides thereof" and same page, line 71, after the word "rail" insert the words *extending beyond the sides thereof;* and that the said Letters Patent should be read with these corrections therein that the same may conform to the record of the case in the Patent Office.

Signed and sealed this 30th day of December, A. D., 1913.

[SEAL.]

J. T. NEWTON,
*Acting Commissioner of Patents.* tions having coupling means at their ends, each section comprising a rail, a series of yokes arranged on said rail, studs on said yokes and antifriction wheels on said studs extending above said yokes.

In testimony whereof, I have signed my name to this specification in the presence of two subscribing witnesses.

WILLIAM STEWART McCURDY.

Witnesses:
DANIEL I. YORK,
F. C. CASWELL.

Copies of this patent may be obtained for five cents each, by addressing the "Commissioner of Patents, Washington, D. C."

---

Corrections in Letters Patent No. 1,077,540.

It is hereby certified that in Letters Patent No. 1,077,540, granted November 4, 1913, upon the application of William Stewart McCurdy, of St. Paul, Minnesota, for an improvement in "Gravity-Carriers," errors appear in the printed specification requiring correction as follows: Page 1, lines 70-71, strike out the words "extending beyond the sides thereof" and same page, line 71, after the word "rail" insert the words *extending beyond the sides thereof;* and that the said Letters Patent should be read with these corrections therein that the same may conform to the record of the case in the Patent Office.

Signed and sealed this 30th day of December, A. D., 1913.

[SEAL.]

J. T. NEWTON,
*Acting Commissioner of Patents.*

It is hereby certified that in Letters Patent No. 1,077,540, granted November 4, 1913, upon the application of William Stewart McCurdy, of St. Paul, Minnesota, for an improvement in "Gravity-Carriers," errors appear in the printed specification requiring correction as follows: Page 1, lines 70–71, strike out the words "extending beyond the sides thereof" and same page, line 71, after the word "rail" insert the words *extending beyond the sides thereof;* and that the said Letters Patent should be read with these corrections therein that the same may conform to the record of the case in the Patent Office.

Signed and sealed this 30th day of December, A. D., 1913.

[SEAL.]

J. T. NEWTON,
*Acting Commissioner of Patents.*